United States Patent [19]

Branger

[11] Patent Number: 5,700,407
[45] Date of Patent: Dec. 23, 1997

[54] MOLDED POLYMERIC FOAM PREPARATION METHOD

[76] Inventor: Robert Michael Branger, P.O. Box 30444, Jackson, Wyo. 83001

[21] Appl. No.: 639,717

[22] Filed: Apr. 29, 1996

Related U.S. Application Data

[63] Continuation of Ser. No. 389,462, Feb. 14, 1995, abandoned.

[51] Int. Cl.$^6$ .................................................. B29C 44/10
[52] U.S. Cl. ........................ 264/54; 264/52; 264/500
[58] Field of Search ............................. 264/500, 54, 52

[56] References Cited

U.S. PATENT DOCUMENTS

| | | | |
|---|---|---|---|
| 3,160,689 | 12/1964 | Brunner | 264/500 |
| 3,389,198 | 6/1968 | Taber | 264/500 |
| 3,642,965 | 2/1972 | Nuttall et al. | 264/500 |
| 3,812,225 | 5/1974 | Hosoda et al. | 264/54 |
| 4,208,368 | 6/1980 | Egli | 264/45.5 |
| 4,436,679 | 3/1984 | Winstead | 264/54 |
| 4,824,732 | 4/1989 | Hendry et al. | 264/500 |
| 5,374,383 | 12/1994 | Brambach | 264/54 |

FOREIGN PATENT DOCUMENTS

| | | | |
|---|---|---|---|
| 0186110 | 7/1986 | European Pat. Off. | 264/54 |
| 52-21071 | 2/1977 | Japan | 264/54 |
| 56-121739 | 9/1981 | Japan | 264/54 |
| 3-86513 | 4/1991 | Japan | 264/54 |
| 3169622 | 7/1991 | Japan | 264/54 |

*Primary Examiner*—Allan R. Kuhns
*Attorney, Agent, or Firm*—Huntley & Associates

[57] ABSTRACT

Foamed articles having excellent properties are prepared by partially filling a mold with foamable composition, pressurizing the mold while heating to activate blowing agent and crosslinking agent, and releasing the pressure while the polymer is at least partially crosslinked to permit the foam to fill the mold.

9 Claims, No Drawings

MOLDED POLYMERIC FOAM PREPARATION METHOD

This is a continuation of application Ser. No. 08/389,462 filed Feb. 14, 1995, now abandoned.

BACKGROUND OF THE INVENTION

Articles of foamed polymers have previously been prepared through the use of hot molds, in which a compounded polymeric material containing chemical blowing agent and crosslinking agent is placed or injected, and wherein the mold is maintained at a temperature higher than the decomposition temperature of the blowing agent and the activation temperature of the crosslinking agent. In such processes, the mold is filled and held together by a press. After the blowing agent is activated, the mold is opened and the polymeric material is expanded by the blowing agent and leaves the mold.

This method of production has been limited to shapes that can leave the mold easily. Moreover, the overall process, involving significant expansion after release from the mold, limits the shapes and density of the final product. Large draft angles and quick opening presses used in such processes help the part exit the mold, but complex shapes cannot be processed in this way, since deformation and tearing will occur as the part expands and leaves the mold. In addition, if the part does exit the mold without tearing or deforming, size uniformity of the parts is poor and deteriorates as the density is reduced.

SUMMARY OF THE INVENTION

The instant invention provides a process for the preparation of foamed polymeric articles that results in excellent product uniformity at low densities.

Specifically, the instant invention provides a process for the preparation of foamed polymeric articles comprising:

(a) formulating a foamable polymer composition comprising polymer, crosslinking agent and blowing agent, the blowing agent having a decomposition temperature;

(b) heating a mold to a temperature higher than the decomposition temperature of the blowing agent;

(c) filling up to about 50% of the volume of the mold with the foamable composition, sealing the mold and pressurizing the sealed mold with inert gas to a pressure of at least about 500 psi to maintain the blowing agent substantially in solution within the foamable polymer composition;

(d) heating the foamable composition to above the decomposition temperature of the blowing agent and above the activation temperature of the crosslinking agent;

(e) maintaining the pressure within the mold until the polymer in the foamable composition is at least partially crosslinked; and (f) releasing the pressure within the mold.

DETAILED DESCRIPTION OF THE INVENTION

The present invention is applicable to the preparation of foamed articles of a wide variety of polymers, including, for example, polyolefins such as polyethylene and polypropylene; ethylene copolymers and terpolymers such as ethylene vinyl acetate copolymer; thermoplastic and thermosetting elastomers; polyesters such as polyethylene terephthylate and polybutylene terephthylate; as well as blends and alloys of two or more of such polymers. Polyolefins and ethylene vinyl acetate copolymers have been found to be particularly suitable for the instant process.

A foamable composition is prepared by blending the polymer to be foamed with crosslinking agent and blowing agent. Crosslinking agents which can be used will depend on the particular polymer used in the foaming process, but can include peroxide and sulfur crosslinking agents. Of these, dicumyl peroxide has been found to be particularly satisfactory with the preferred ethylene vinyl acetate copolymer resins. Typically, the crosslinking agent will be used in quantities of about from 0.5 to 3.0 parts per 100 parts of the polymer resin.

Blowing agents which can be used in the present invention will similarly depend on the particular polymer being foamed. Representative blowing agents which can be used include azobisisobutyronitrile, azodicarbonamid, p-toluene sulfonylhydrazide, 4,4'-oxybis (benzenesulfonyhydrazide), N,N-dinitrosopentamethylenetetramine and sodium bicarbonate. Still other blowing agents that can be used in the instant invention include modified azodicarbonamids, hydrazides, and 5-phenyltetrazole.

The amount of blowing agent used will, in part, depend on the desired density of the final foamed product. However, in general, the amount of blowing agent will be about from 1 to 10 parts of blowing agent per 100 parts of resin. About from 2 to 5 parts of blowing agent, per 100 parts of resin, has been found to be particularly satisfactory. The foamable composition is typically also formulated with blowing coagents to reduce the cycle time by increasing crosslinking rate, blowing agent activator release agents and fillers, as will be recognized by those skilled in the art of preparing foamed articles. Typical release agents include zinc stearate and stearic acid. Zinc oxide is often used as a blowing agent activator and release agent.

The components of the foamable composition can be blended by any suitable means, for example, a high shear mixer or kneader such as a Banbury mixer. Extrusion apparatus can also be used for blending, such as conventional twin screw extruders.

In accordance with the instant process, the foamable composition is introduced into a mold that is heated to a temperature higher than the decomposition temperature of the particular blowing agent used. While this temperature will vary with the particular blowing agent selected, it should be at least about 160° C., for example, for the preferred modified azodicarbonamid blowing agents. Typically, the blowing agent and the crosslinking agent are selected to have substantially the same decomposition and activation temperature, respectively.

In the instant process, the mold is filled with the foamable composition to less than about 50% of its volume. The degree to which the mold is filled will necessarily depend on the final density desired in the molded article. Thus, for example, if the foamable composition has a density of 1 gm/cc, filling the mold to 20% of its volume will result in a foamed article having 0.2 gm/cc. Preferably, less than about 25% of the mold is filled with the foamable composition.

After injection of the desired quantity of the foamable composition into the heated mold, the mold is pressurized with gas that is substantially inert to the system. Such gases can include, for example, carbon dioxide, nitrogen and air. Nitrogen is generally preferred to prevent oxidation of the finished part. However, for black parts, in which discoloration is not a consideration, air can be used for the pressurization of the foamable composition within the mold. The interior of the mold should be pressurized to a pressure sufficient to maintain the decomposing blowing agent substantially in solution within the polymer composition. In general, a pressure of at least about 500 psi is desirable, and the pressure can be up to about 3000 psi. Typically, with higher gas pressures, finer cell structure will be realized. However, no significant change in cell structure is realized at pressures greater than about 3000 psi, and in general, little additional benefit in maintaining the expanding gas in solution is realized at pressures of greater than about 2000 psi. Pressures of about from 800 to 2000 psi are accordingly particularly preferred for the instant process. The pressure inside the mold is maintained while the foamable composition is heated to above the decomposition temperature of the blowing agent. The pressure is maintained until the polymer in the foamable composition is at least partially crosslinked. This is typically indicated by an increase in the viscosity of the foamable composition. At this point, the pressure within the mold is released to permit the compounded polymeric material to expand to fill the entire volume of the mold. In general, for ethylene/vinyl acetate copolymers and dicumal peroxide crosslinking agent, a period of about from 5 to 15 minutes is adequate for the desired crosslinking, depending on cross-sectional thickness and temperature.

The instant process permits the preparation of low density closed cell foams having a density of as low as 0.05 gm/cc which have a uniform cell structure throughout the foamed part and a smooth skin. The present process permits the manufacture of complex closed cell foamed shapes that have good part-to-part size uniformity. The resulting products exhibit excellent cell uniformity at these low densities. Accordingly, the process of the instant invention can be used for making parts for footwear products such as midsoles, outsoles, or sockliners; wheels for vehicles such as baby buggies, golf carts and tricycles; flotation devices; insulation layers for drink or food containers; sporting good components such as padding for helmets and other protective pads; automotive parts such as visors and dashboards, and similar applications in which low densities and complex shapes are required.

The present invention is further illustrated by the following specific example.

EXAMPLE

A foamable composition is prepared by formulating ethylene vinyl acetate copolymer containing 18% vinyl acetate and 82% ethylene. This copolymer is blended in a Banbury mixer, with 3 parts azodicarbonamid blowing agent, 0.9 parts dicumyl peroxide crosslinking agent and 3.5 parts zinc oxide blowing agent activator, all based on 100 parts of the ethylene vinyl acetate resin. The resulting compound is removed from the Banbury mixer after 5 minutes of mixing, cooled and pelletized. Using an injection molding machine with a compression ratio screw of less than 1.7 to 1, the compounded polymeric material is injected into a mold cavity that is the same shape and dimensions as the desired part. The mold is preheated to a temperature of 180° C. The mold is filled 20% of its volume with the compounded polymeric material with an injection molding machine having a barrel temperature set at 80° C. so that the blowing agent is not activated during the injection molding. The compounded polymeric material has a density of about 1.0 gm/cc. The mold is purged of oxygen by use of a vacuum to prevent yellowing of the ethylene vinyl acetate during the heating process and the mold was pressurized at 1500 psi. The heat of the preheated mold is sufficient to raise the temperature of the foamable composition to above the decomposition temperature of the blowing agent, and maintained for 7 minutes to assure substantial crosslinking of the polymer, as evidenced by an increase in the viscosity of the foamable composition. The nitrogen pressure is then released to permit expansion of the compounded polymeric material within the mold. The compounded polymeric material then expands to overfill the mold slightly, forming a skin. After allowing the part to set for one minute, it is removed from the mold. Inspection of the finished part indicates excellent uniformity of cell structure, a smooth skin and excellent conformity to the shape of the mold.

I claim:
1. A process for the preparation of foamed polymeric articles consisting essentially of:
   (a) formulating a foamable polymer composition comprising polymer, crosslinking agent and blowing agent, the blowing agent having a decomposition temperature;
   (b) heating a mold to a temperature higher than the decomposition temperature of the blowing agent;
   (c) filling less than about 25% of the volume of the mold with the foamable composition, sealing the mold and pressurizing the sealed mold with inert gas to a pressure of at least about 500 psi;
   (d) heating the foamable polymer composition to above the decomposition temperature of the blowing agent and above the activation temperature of the crosslinking agent;
   (e) maintaining the pressure within the mold to maintain the resulting decomposed blowing agent substantially in solution within the foamable polymer composition until the polymer in the foamable polymer composition is at least partially crosslinked; and
   (f) releasing the pressure within the mold.
2. A process of claim 1 wherein the foamable polymer composition further polymer comprises at least one nucleating agent.
3. A process of claim 1 wherein the blowing agent comprises at least one carbonamide.
4. A process of claim 3 wherein the blowing agent consists essentially of azodicarbonamide and the foamable composition is heated to a temperature of at least about 160 degrees C.
5. A process of claim 1 wherein the mold is pressurized to about from 500 to 3000 psi.
6. A process of claim 5 wherein the mold is pressurized to about from 800 to 2000 psi.
7. A process of claim 1 wherein the polymer is selected from the group consisting of polyolefins and ethylene polymers comprising at least about 50% ethylene.
8. A process of claim 1 wherein up to about 20% of the volume of the mold is filled with the foamable polymer composition.
9. A process for the preparation of foamed polymeric articles consisting essentially of:
   (a) formulating a foamable polymer composition comprising polymer, crosslinking agent and blowing agent, the blowing agent having a decomposition temperature, wherein the polymer consists essentially of ethylene/vinyl acetate copolymer;
   (b) heating a mold to a temperature higher than the decomposition temperature of the blowing agent;
   (c) filling up to about 50% of the volume of the mold with the foamable composition, sealing the mold and pressurizing the mold with inert gas to a pressure of at least about 500 psi;
   (d) heating the foamable polymer composition to above the decomposition temperature of the blowing agent and above the activation temperature of the crosslinking agent;
   (e) maintaining the pressure within the mold to maintain the resulting decomposed blowing agent substantially in solution within the foamable polymer composition until the polymer in the foamable polymer composition is at least partially crosslinked; and
   (f) releasing the pressure within the mold.

* * * * *